(12) United States Patent
Terakado et al.

(10) Patent No.: US 7,356,829 B1
(45) Date of Patent: Apr. 8, 2008

(54) RECEIVING APPARATUS AND METHOD, TRANSMITTING APPARATUS AND METHOD, AND TRANSMISSION MEDIUM

(75) Inventors: Tomoko Terakado, Kanagawa (JP); Tomoyuki Hanai, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/114,352

(22) Filed: Jul. 13, 1998

(30) Foreign Application Priority Data

Jul. 18, 1997 (JP) .................................. P9-193589

(51) Int. Cl.
*H04N 5/445* (2006.01)

(52) U.S. Cl. .......................................... 725/44; 725/48

(58) Field of Classification Search ................. 725/47, 725/46, 50, 133, 141, 153, 146, 40, 54, 48, 725/44
See application file for complete search history.

(56) References Cited

U.S. PATENT DOCUMENTS

| | | | |
|---|---|---|---|
| 5,550,576 A * | 8/1996 | Klosterman ................. | 725/46 |
| 5,559,548 A * | 9/1996 | Davis et al. ................. | 725/40 |
| 5,579,055 A * | 11/1996 | Hamilton et al. ............ | 725/49 |
| 5,635,978 A | 6/1997 | Alten et al. ................. | 348/7 |
| 5,737,029 A | 4/1998 | Ohkura et al. .............. | 348/564 |
| 5,801,787 A | 9/1998 | Schein et al. ............... | 348/569 |
| 5,848,352 A | 12/1998 | Dougherty et al. .......... | 455/5.1 |
| 5,867,226 A | 2/1999 | Wehmeyer et al. .......... | 348/563 |
| 5,886,691 A | 3/1999 | Furuya et al. ............... | 345/327 |
| 5,886,995 A | 3/1999 | Arsenault et al. ........... | 370/477 |
| 5,900,905 A | 5/1999 | Shoff et al. ................. | 348/12 |
| 5,903,262 A * | 5/1999 | Ichihashi et al. ............ | 725/136 |
| 5,903,314 A | 5/1999 | Niijima et al. .............. | 348/564 |
| 5,907,323 A | 5/1999 | Lawler et al. ............... | 345/327 |
| 5,926,179 A | 7/1999 | Matsuda et al. ............. | 345/355 |
| 5,926,230 A | 7/1999 | Niijima et al. .............. | 348/564 |
| 5,931,908 A | 8/1999 | Gerba et al. ................ | 709/219 |
| 5,940,073 A * | 8/1999 | Klosterman et al. ........ | 345/721 |
| 6,005,562 A | 12/1999 | Shiga et al. ................. | 345/327 |
| 6,057,856 A | 5/2000 | Miyashita et al. .......... | 345/435 |
| 6,084,643 A | 7/2000 | Kishtaka et al. ............ | 348/725 |
| 6,147,714 A * | 11/2000 | Terasawa et al. ........... | 348/564 |
| 6,665,873 B1 * | 12/2003 | Van Gestel et al. ......... | 725/136 |

FOREIGN PATENT DOCUMENTS

| | | |
|---|---|---|
| JP | 9-83891 | 3/1997 |
| JP | 9-182035 | 7/1997 |
| WO | WO 92/04801 | 3/1992 |

* cited by examiner

*Primary Examiner*—Andrew Y Koenig
(74) *Attorney, Agent, or Firm*—Oblon, Spivak, McClelland, Maier & Neustadt, P.C.

(57) ABSTRACT

A receiving apparatus receives an image signal transmitted from a transmitting end. In the receiving apparatus, the received image signal is output to a display. Electronic program guide information (EPG) added to the received image signal is extracted. The display format of the EPG is altered in accordance with predetermined information. And, the altered EPG is output to the display. A transmitting apparatus transmits an image signal to a receiving end. In the transmitting apparatus, the image signal, EPG, information representing a broadcasting station providing the EPG are generated. The EPG and the information representing the broadcasting station are added to the image signal. And, a signal formed by adding the EPG and the information representing the broadcasting station to the image signal is transmitted to the receiving end.

19 Claims, 12 Drawing Sheets

| | 16 : 00 | 16 : 30 | | 17 : 00 | |
|---|---|---|---|---|---|
| ASAHI | SUIYO SUSPENSE | | RYORI | SASURAI KEIJI KANJO-HEN | |
| NIPPON | GINGA TETUDO 999 | | IENAKIKO | | |
| SOGO | NE | ASAGA MAIRIMASHITA | | | |
| KYOIKU | UTA | ODO | ANI | HA | HITORIDE DE | OKASANTO | YAN |

FIG. 3

```
<PROVIDER TAG>
   ASAHI
</PROVIDER TAG>
<BROADCAST FILE 1>
   <BROADCAST DATE>DECEMBER 24, 1997, 16 : 00 - 16 : 10 </BROADCAST DATE>
   <BROADCASTING STATION> SOGO</BROADCASTING STATION>
   <PROGRAM NAME>NEWS</PROGRAM NAME>
</BROADCAST FILE 1>
<BROADCAST FILE 2>
   <BROADCAST DATE>DECEMBER 24, 1997, 16 : 00 - 16 : 10 </BROADCAST DATE>
   <BROADCASTING STATION> KYOIKU</BROADCASTING STATION>
   <PROGRAM NAME>UTAWA TOMODACHI</PROGRAM NAME>
</BROADCAST FILE 2>
<BROADCAST FILE 3>
   <BROADCAST DATE>DECEMBER 24, 1997, 16 : 00 - 16 : 30 </BROADCAST DATE>
   <BROADCASTING STATION> NIPPON </BROADCASTING STATION>
   <PROGRAM NAME>GINGA TETSUDO 999 </PROGRAM NAME>
</BROADCAST FILE 3>
<BROADCAST FILE 4>
   <BROADCAST DATE>DECEMBER 24, 1997, 16 : 00 - 16 : 30 </BROADCAST DATE>
   <BROADCASTING STATION> TOKYO </BROADCASTING STATION>
   <PROGRAM NAME>MITO KOMON </PROGRAM NAME>
</BROADCAST FILE 4>
<BROADCAST FILE 5>
   <BROADCAST DATE>DECEMBER 24, 1997, 16 : 00 - 16 : 30 </BROADCAST DATE>
   <BROADCASTING STATION> FUJI </BROADCASTING STATION>
   <PROGRAM NAME>ORYORI GANBARU </PROGRAM NAME>
</BROADCAST FILE 5>
<BROADCAST FILE 6>
   <BROADCAST DATE>DECEMBER 24, 1997, 16 : 00 - 16 : 45 </BROADCAST DATE>
   <BROADCASTING STATION> ASAHI</BROADCASTING STATION>
   <PROGRAM NAME> SUIYOU SUSPENSE </PROGRAM NAME>
</BROADCAST FILE 6>
```

FIG. 6

|        | 16:00 | | 16:30 | | 17:00 | |
|--------|-------|------|-------|------|------|-----|
| ASAHI  | SUIYO SUSPENSE | | | RYORI | SASURAI KEIJI KANJO-HEN | |
| SOGO   | NE    | ASAGA MAIRIMASHITA | | | | |
| KYOIKU | UTA   | ODO | ANI | HA | HITORIDE DE | OKASANTO | YAN |
| NIPPON | GINGA TETUDO 999 | | IENAKIKO | | | |

FIG. 7

|        | 16:00 | | | 16:30 | | 17:00 | |
|--------|-------|---|---|-------|---|-------|---|
| SOGO   | NE    | ASAGA MAIRIMASHITA | | | | | |
| KYOIKU | UTA   | ODO | ANI | HA | HITORIDE DE | OKASANTO | YAN |
| NIPPON | GINGA TETUDO 999 | | | IENAKIKO | | | |
| TOKYO  | MITO KOMON | | | BOKUGA KANOJONI SHAKKIN | | | |
| FUJI   | ORYORI GANBARU | | | SHINBAN! NAMA NAMA NAMA HOSO | | | |
| ASAHI  | SUIYO SUSPENSE | | | | RYORI | SASURAI KEIJI KANJO-HEN | |

FIG. 8

|  | 16 : 00 | | 16 : 30 | 17 : 00 | |
|---|---|---|---|---|---|
| ASAHI | SUIYO SUSPENSE | | RYORI | SASURAI KEIJI KANJO-HEN | |
| NIPPON | GINGA TETUDO 999 | IENAKIKO | | | |
| SOGO | NE | ASAGA MAIRIMASHITA | | | |
| KYOIKU | UTA | ODO | ANI | HA | HITORIDE DE | OKASANTO | YAN |

FIG. 11

| FREQUENCIES | CHANNEL IDS |
|---|---|
| 90 – 96 | SOGO |
| 102 – 108 | KYOIKU |
| 170 – 176 | NIPPON |
| 182 – 188 | TOKYO |
| 192 – 198 | FUJI |
| 204 – 210 | ASAHI |

FIG. 12

| | 16 : 00 | | | | 16 : 30 | | 17 : 00 | |
|---|---|---|---|---|---|---|---|---|
| ASAHI | SUIYO SUSPENSE "MIKKAINO SATSUJIN JIKEN" NAKAO KIYO MORIMOTO REO MATUSHIMA SHIN-ICHI YOSHIDA KAZUKO | | | | RYORI KANINO MUSHI | | SASURAI KEIJI KANJO-HEN "SHISANKA KIETA" NISHIDA MAKOTO | |
| SOGO | NE | ASAGA MAIRIMASHITA | | | | | | |
| KYOIKU | UTA | ODO | ANI | HA | HITORIDE DE | | OKASANTO | YAN |
| NIPPON | GINGA TETUDO 999 | | | IENAKIKO | | | | |

RECEIVING APPARATUS AND METHOD, TRANSMITTING APPARATUS AND METHOD, AND TRANSMISSION MEDIUM

BACKGROUND OF THE INVENTION

1. Field of the Invention

The present invention relates to receiving apparatuses and methods, transmitting apparatuses and methods, and transmission media, and in particular, to a receiving apparatus and method, a transmitting apparatus and method, and a transmission medium which are used for receiving and transmitting an image signal with electronic program guide information (hereinafter referred to as "EPG").

2. Description of the Related Art

Recently, a system has become known in which a television broadcast signal with, e.g., EPG is transmitted and the signal is received and displayed by domestic receiving apparatuses.

In this system, when program information forming the EPG is displayed, the program information can be displayed in the order of broadcasting stations designated by a user. The "StarSight" (service mark) and the "GuidePlus+" (service mark) are known examples of this system in North America.

In the case where a particular broadcasting station transmits EPG including program information from all broadcasting stations, a receiving end treats program information from the particular broadcasting station as equivalent to program information from the other broadcasting stations. Thus, the particular broadcasting station cannot benefit by providing the information on all the programs.

In addition, when the user, who is watching a program from a predetermined broadcasting station, recognizes a program to be broadcast after the present program, program information is displayed in the order of broadcasting stations initially designated by the user, which requires the user to spend time finding a program from the desired broadcasting station.

SUMMARY OF THE INVENTION

Accordingly, it is an object of the present invention to provide a receiving apparatus and method, a transmitting apparatus and method, and a transmission medium which are used to display program information so as to reflect an intention of a sponsor for the program information and be easily usable by a user.

To this end, according to a first aspect of the present invention, the foregoing object has been achieved through provision of a receiving apparatus for receiving an image signal transmitted from a transmitting end, the receiving apparatus including: receiving means for receiving the image signal; first output means for outputting the image signal received by the receiving means to a display; extracting means for extracting EPG added to the image signal received by the receiving means; alteration means for altering the display format of the EPG when the EPG is displayed on the display, in accordance with predetermined information; and second output means for outputting the EPG altered by the alteration means to the display.

According to a second aspect of the present invention, the foregoing object has been achieved through provision of a receiving method for receiving an image signal transmitted from a transmitting end, the receiving method including: a receiving step for receiving the image signal; a first output step for outputting the image signal received in the receiving step to a display; an extracting step for extracting EPG added to the image signal received in the receiving step; an alteration step for altering the display format of the EPG when the EPG is displayed on the display, in accordance with predetermined information; and a second output step for outputting the EPG altered in the alteration step to the display.

According to a third aspect of the present invention, the foregoing object has been achieved through provision of a transmission medium for transmitting a computer program used in a receiving apparatus for receiving an image signal transmitted from a transmitting end, in which the computer program includes: a receiving step for receiving the image signal; a first output step for outputting the image signal received by the receiving step to a display; an extracting step for extracting EPG added to the image signal received in the receiving step; an alteration step for altering the display format of the EPG when the EPG is displayed on the display, in accordance with predetermined information; and a second output step for outputting the EPG altered in the alteration step to the display.

According to a fourth aspect of the present invention, the foregoing object has been achieved through provision of a transmitting apparatus for transmitting an image signal to a receiving end, the transmitting apparatus including: first generating means for generating the image signal; second generating means for generating EPG; third generating means for generating information representing a broadcasting station providing the EPG; adding means for adding the EPG generated by the second generating means and the information representing the broadcasting station, which is generated by the third generating means to the image signal generated by the first generating means; and transmitting means for transmitting to the receiving end the signal obtained by adding the EPG and the information representing the broadcasting station to the image signal.

According to a fifth aspect of the present invention, the foregoing object has been achieved through provision of a transmitting method for transmitting an image signal to a receiving end, the transmitting method including: a first generating step for generating the image signal; a second generating step for generating EPG; a third generating step for generating information representing a broadcasting station providing the EPG; an adding step for adding the EPG generated in the second generating step and the information representing the broadcasting station, which is generated in the third generating step, to the image signal generated in the first generating step; and a transmitting step for transmitting to the receiving end the signal obtained in the adding step by adding the EPG and the information representing the broadcasting station to the image signal.

According to a sixth aspect of the present invention, the foregoing object has been achieved through provision of a transmission medium for transmitting a computer program used in a transmitting apparatus for transmitting an image signal to a receiving end, wherein the computer program includes: a first generating step for generating the image signal; a second generating step for generating EPG; a third generating step for generating information representing a broadcasting station providing the EPG; an adding step for adding the EPG generated in the second generating step and the information representing the broadcasting station, which is generated in the third generating step, to the image signal generated in the first generating step; and a transmitting step for transmitting to the receiving end the signal obtained in the adding step by adding the EPG and the information representing the broadcasting station to the image signal.

BRIEF DESCRIPTION OF THE DRAWINGS

FIG. 3 is EPG with provider information.

FIG. 6 is an example of an image displayed on a cathode ray tube, which is obtained by executing the process shown in FIG. 5.

FIG. 7 is a normally displayed EPG image.

FIG. 8 is an image displayed on a cathode ray tube, which is obtained by executing the process shown in FIG. 5.

FIG. 11 is a table showing the correspondence between receiving frequencies and channel Ids which are stored in the ROM shown in FIG. 9.

FIG. 12 is an image displayed on a cathode ray tube, which is obtained by executing the process shown in FIG. 10.

DESCRIPTION OF THE PREFERRED EMBODIMENTS

Figure 1:
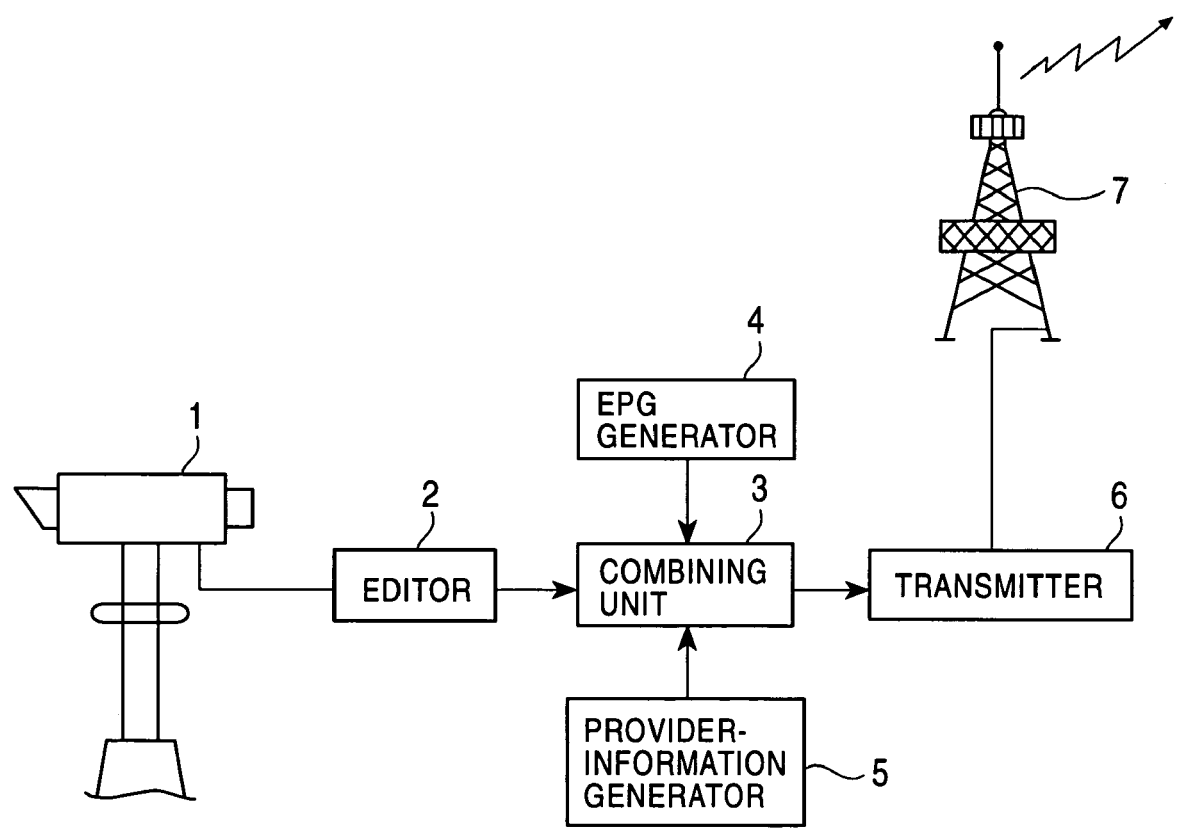
FIG. 1 is a block diagram showing a first embodiment of a transmitting apparatus according to the present invention.

FIG. 1 shows a block diagram of an embodiment of a transmitting apparatus according to the present invention.

In FIG. 1, an optical image and sound of a subject is input to a television camera 1, and the television camera 1 generates and outputs the corresponding image signal and sound signal. A signal to which a sound signal has been added will be simply referred to as an "image signal" below.

An editor 2 records the image signal output from the television camera 1, and properly combines a plurality of recorded image signals to generate an image signal constituting one program.

An EPG generator 4 generates and outputs EPG (whose details will be described below) composed of program information from a plurality of broadcasting stations.

A provider information generator 5 generates information on broadcasting stations as EPG providers, such as "ASAHI".

A combining unit 3 adds the EPG output from the EPG generator 4 and the provider information output from the provider information generator 5 to the image signal output from the editor 2, and outputs it.

The combining unit 3 superposes, for example, the EPG and the provider information on each other in a vertical retrace blanking period of the image signal, and outputs it.

A transmitter 6 modulates a carrier in accordance with the image signal output from the combining unit 3, and amplifies the power of the carrier.

An antenna 7 transmits the carrier output from the transmitter 6 to domestic receivers.

Next, the operation of the above-described embodiment will be described with reference to the flowchart shown in FIG. 2.

Figure 2:
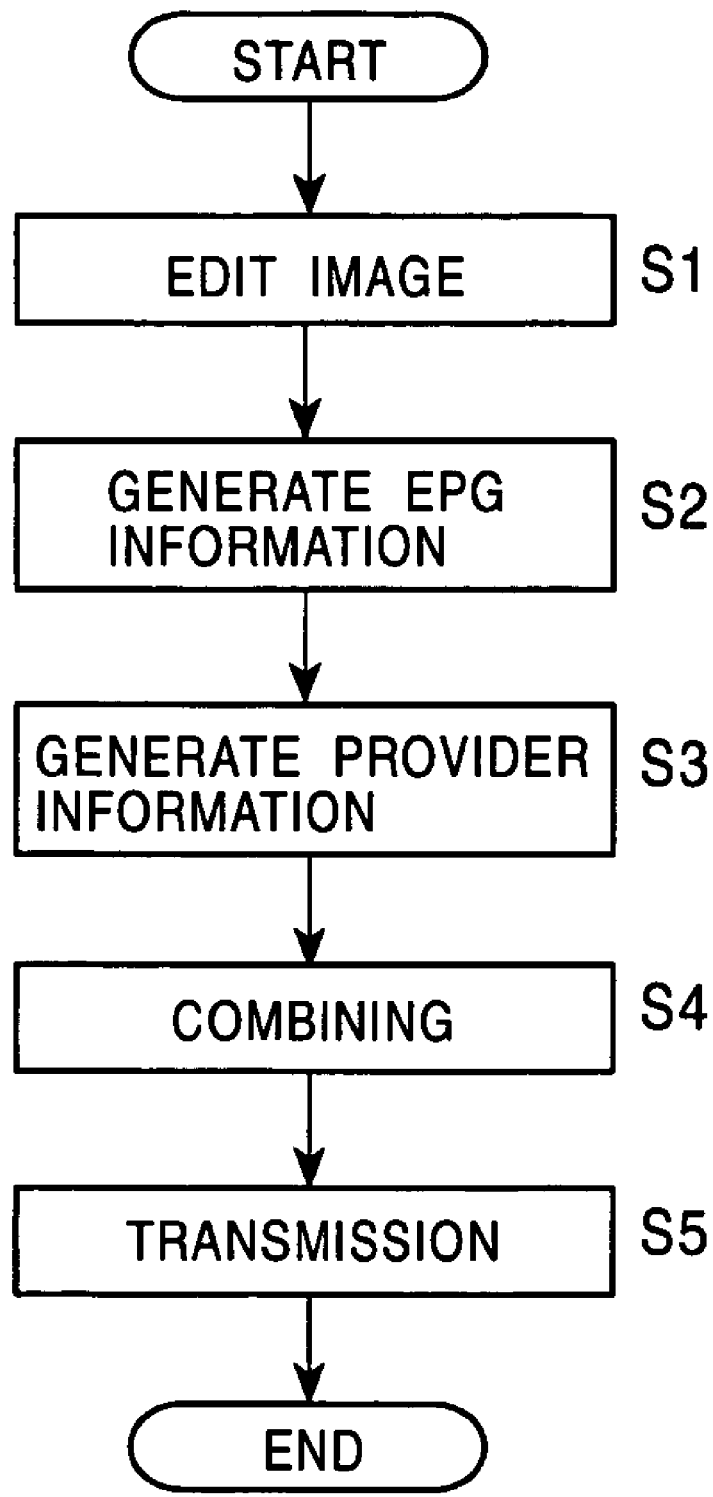
FIG. 2 is a flowchart illustrating a process executed in the transmitting apparatus shown in FIG. 1.

FIG. 2 shows a flowchart illustrating one process executed by the transmitting apparatus shown in FIG. 1.

In step S1 of this process, an image signal output from the television camera 1 is supplied to the editor 2, in which it is once recorded and the image is subsequently edited so as to form a program having a predetermined length. The edited image signal is output to the combining unit 3.

In step S2, the EPG generator 4 generates and supplies EPG to the combining unit 3.

In step S3, the provider information generator 5 generates and supplies provider information to the combining unit 3.

In step S4, the EPG supplied from the EPG generator 4 and the provider information supplied from the provider information generator 5 are added to the image signal supplied from the editor 2. In other words, the combining unit 3 initially adds the provider information supplied from the provider information generator 5 to the EPG supplied from the EPG generator 4.

FIG. 3 shows one example of the EPG, to which the provider information (provider tag) has been added. In this example, at the start of the EPG, "ASAHI" as a provider tag is disposed between two pairs of brackets indicating the type of information. In other words, just after <PROVIDER TAG> indicating the start and type of information, provider tag "ASAHI" is disposed, and </PROVIDER TAG> indicating the end of information is disposed.

Subsequently, <BROADCAST FILE 1> to <BROADCAST FILE 6> representing programs are disposed. For example, concerning broadcast file 1, <BROADCAST FILE 1> indicating the type and start of information is displayed. Next, subsequently to <BROADCAST DATE> indicating a broadcast date, the date on which the broadcast file 1 is broadcast: Dec. 24, 1997, 16:00-16:10; and </BROADCAST DATE> representing the end of information are disposed. Subsequently, "SOGO" indicating a broadcasting station is disposed between <BROADCASTING STATION> and </BROADCASTING STATION>, and "NEWS" indicating a program name is disposed between <PROGRAM NAME> and </PROGRAM NAME>. In the same manner, the broadcast files 2-6 are disposed.

The EPG to which the provider tag has been added is superposed on the image signal, for example, its vertical retrace blanking period, by the combining unit 3. The superposed image signal is output to the transmitter 6.

In step S5, the transmitter 6 modulates a carrier in accordance with the image signal, and amplifies and supplies its power to the antenna 7 for transmission. After that, it ends processing.

The structure of a receiving apparatus for receiving the image signal transmitted by the above-described transmitting apparatus will be described below.

Figure 4:
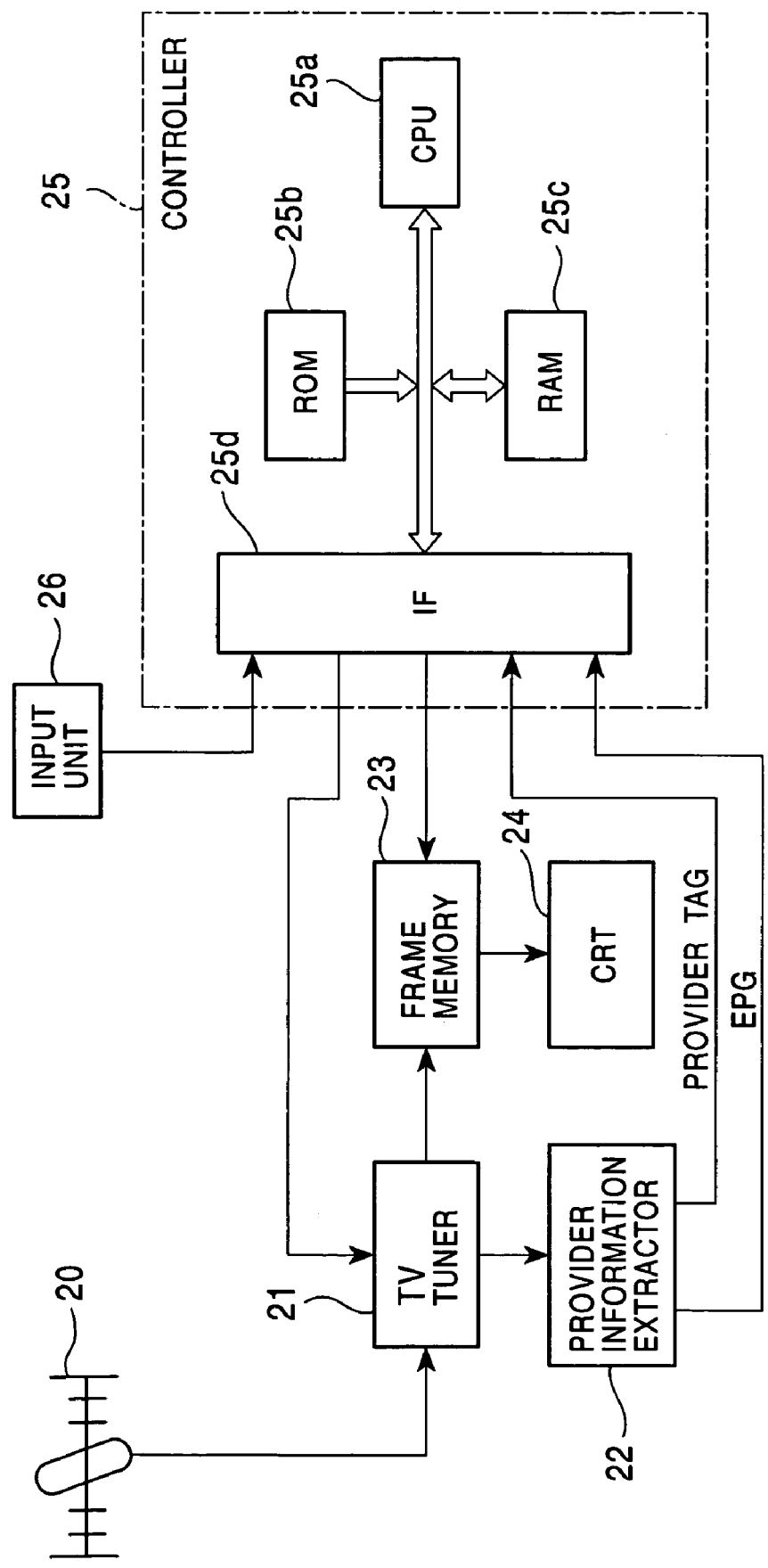
FIG. 4 is a block diagram showing a receiving apparatus according to one embodiment of the present invention.

FIG. 4 shows a block diagram of an embodiment of a receiving apparatus according to the present invention.

In FIG. 4, an antenna 20 is used to receive electric waves transmitted by the antenna 7 at the transmitting end. A television (TV) tuner 21 extracts an image signal by extracting a predetermined frequency (broadcasting station) signal from the electric waves received by the antenna 20 and demodulating it, and the TV tuner 21 extracts EPG included in the image signal.

A provider-information extractor 22 extracts provider information (provider tag) included in the EPG extracted by the TV tuner 21, and outputs the obtained provider tag and EPG.

A frame memory 23 combines the image signal from the TV tuner 21 and the EPG output from a controller 25, or selects either one, and outputs it to a cathode-ray tube (CRT) 24 for display.

The CRT 24 displays the image signal output from the frame memory 23.

The controller 25 includes: a central processing unit (CPU) 25a for controlling other units; a read only memory (ROM) 25b in which predetermined programs to be executed by the CPU 25a and data are stored; a random access memory (RAM) 25c in which, when the CPU 25a performs predetermined computation, data and programs which are being used for the computation are stored; and an interface (IF) 25*d* for converting the format of data when the data is transmitted to or received from an external apparatus.

An input unit 26 is operated when a user provides a predetermined input (for example, input for selecting a receiving channel).

In the above-described embodiment, an amplifier, a speaker, etc. for reproducing a sound signal included in the image signal received by the TV tuner 21 are omitted for a simplified description.

The operation of the above-described embodiment will be described below with reference to the flowchart shown in FIG. 5.

Figure 5:
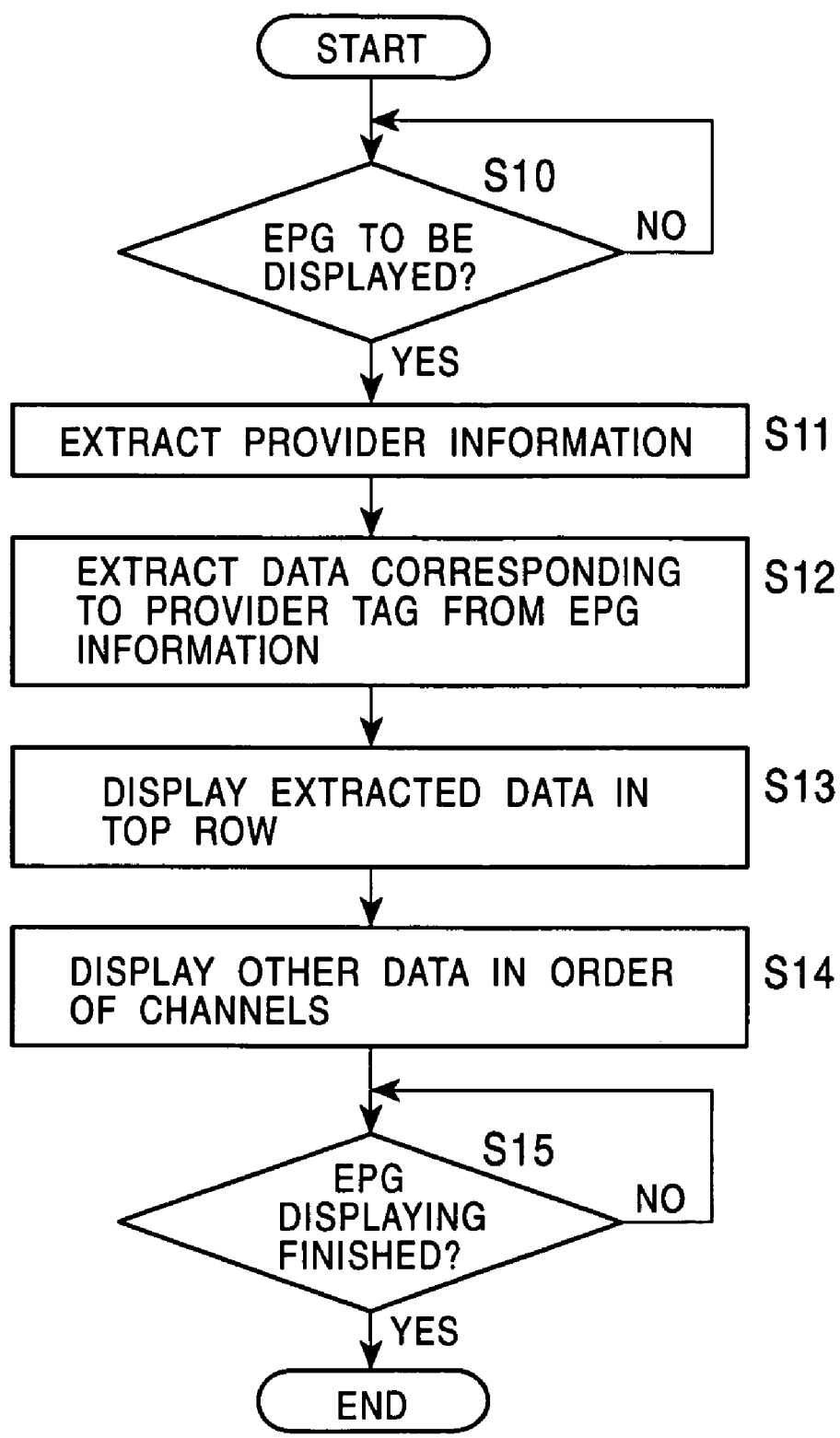
FIG. 5 is a flowchart illustrating a process executed in the receiving apparatus shown in FIG. 4.

FIG. 5 shows the flowchart, which illustrates a process executed in the controller 25 shown in FIG. 4.

When the process shown in FIG. 5 is executed, in step S10, the CPU 25*a* in the controller 25 determines whether or not a predetermined input for displaying EPG has been provided from the input unit 26. If it is determined that the predetermined input has not been provided (NO), the process returns to step S10, in which the same processing is repeatedly performed until the predetermined input is provided. If it is determined that the predetermined input has been provided (YES), the process proceeds to step S11.

In step S11, the CPU 25*a* specifies a broadcasting station that provides EPG by referring to the provider tag (e.g., "ASAHI" etc.) extracted by the provider-information extractor 22. The process proceeds to step S12.

In step S12, the CPU 25*a* extracts from the EPG supplied from the provider-information extractor 22, program information from the broadcasting station corresponding to the provider tag.

It is assumed that the provider tag is "ASAHI", the broadcast file 6 shown in FIG. 3 is extracted as extractive program information. Such program information is transmitted for a one day requirement. Accordingly, in step S12, a plurality of broadcast files are extracted in addition to the broadcast file 6.

In step S13, the CPU 25*a* sets the program information (broadcast file) from the broadcasting station corresponding to the provider tag extracted in step S12 in the frame memory 23 in its top row in the order of time.

In step S14, the CPU 25*a* sets other program information (program information from broadcasting stations excluding the broadcasting station corresponding to the provider tag) in the frame memory 23 in the order of channels.

FIG. 6 shows an example of an image displayed on the CRT 25 as a result of processing in steps S13 and S14. In this example, the programs corresponding to the provider tag "ASAHI", namely, "SUIYO SUSPENSE", "RYORI", and "SASURAI KEIJI KANJO-HEN" are displayed in the top row, with them magnified and the background color changed. Under the programs, "NE (NEWS)" and "ASAGA MAIRIMASHITA" are displayed. Under them, programs from broadcasters "KYOIKU" and "NIPPON" are displayed in a format identical to that in the above case.

In the case where the above-described processing (display alteration in accordance with the provider tag) is not performed, an image as shown in FIG. 7 is displayed. In this image, program information from broadcasting stations is displayed in the order of the following channels: "SOGO" (channel 1), "KYOIKU" (channel 3), "NIPPON" (channel 4), "TOKYO" (channel 6), "FUJI" (channel 8), and "ASAHI" (channel 10). In the same format, information on all broadcasting stations is displayed.

Returning to the flowchart shown in FIG. 5, in step S15, the CPU 25*a* determines whether or not a predetermined input for ending EPG display is provided from the input unit 26. If it is determined that the predetermined input has not been provided (No), the process returns to step S15, in which the same processing is repeatedly performed. If it is determined that the predetermined input has been provided (YES), the process ends.

According to the above-described embodiment, a transmitting apparatus adds to an image signal, provider information indicating broadcast stations that provide EPG, and a receiving apparatus displays in a top row, program information from the broadcast station corresponding to the provider information so that the program information is emphasized. Thus, a possibility in which a user watches the programs from the broadcasting station can be increased.

According to the above-described embodiment, part of the program information is displayed as shown in FIG. 6. However, needless to say, similarly to the case shown in FIG. 7, information on the whole of the program information may be displayed.

In the case where the number of broadcasting stations providing EPG is two, two type of provider information are transmitted. In this case, for example, as shown in FIG. 8, program information corresponding to the two broadcasting stations may be displayed in top rows.

Figure 9:
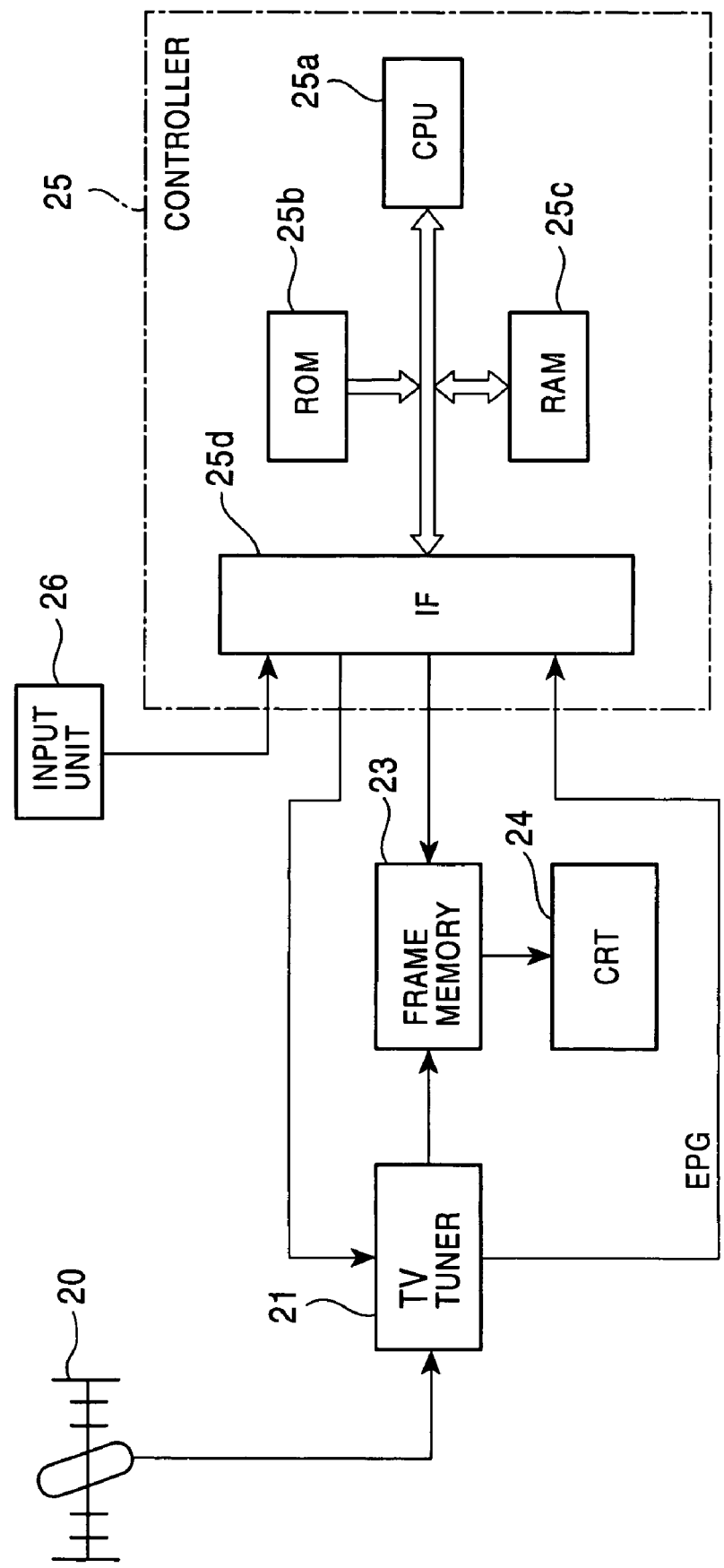
FIG. 9 is a block diagram showing a second embodiment of a receiving apparatus according to the present invention.

FIG. 9 shows a block diagram of a second embodiment of a receiving apparatus according to the present invention. In FIG. 9, components corresponding to those shown in FIG. 4 are denoted by identical reference numerals for omitting descriptions.

Compared with the embodiment shown in FIG. 4, the provider-information extractor 22 is excluded in the second embodiment. In a ROM 25*b* in a controller 25, a table on the correspondence between frequencies and channel identifications (Ids) is stored as shown in FIG. 11. The structures of other components are identical to those shown in FIG. 4.

The operation of the receiving apparatus shown in FIG. 9 will be described below, with reference to the flowchart shown in FIG. 10.

Figure 10:
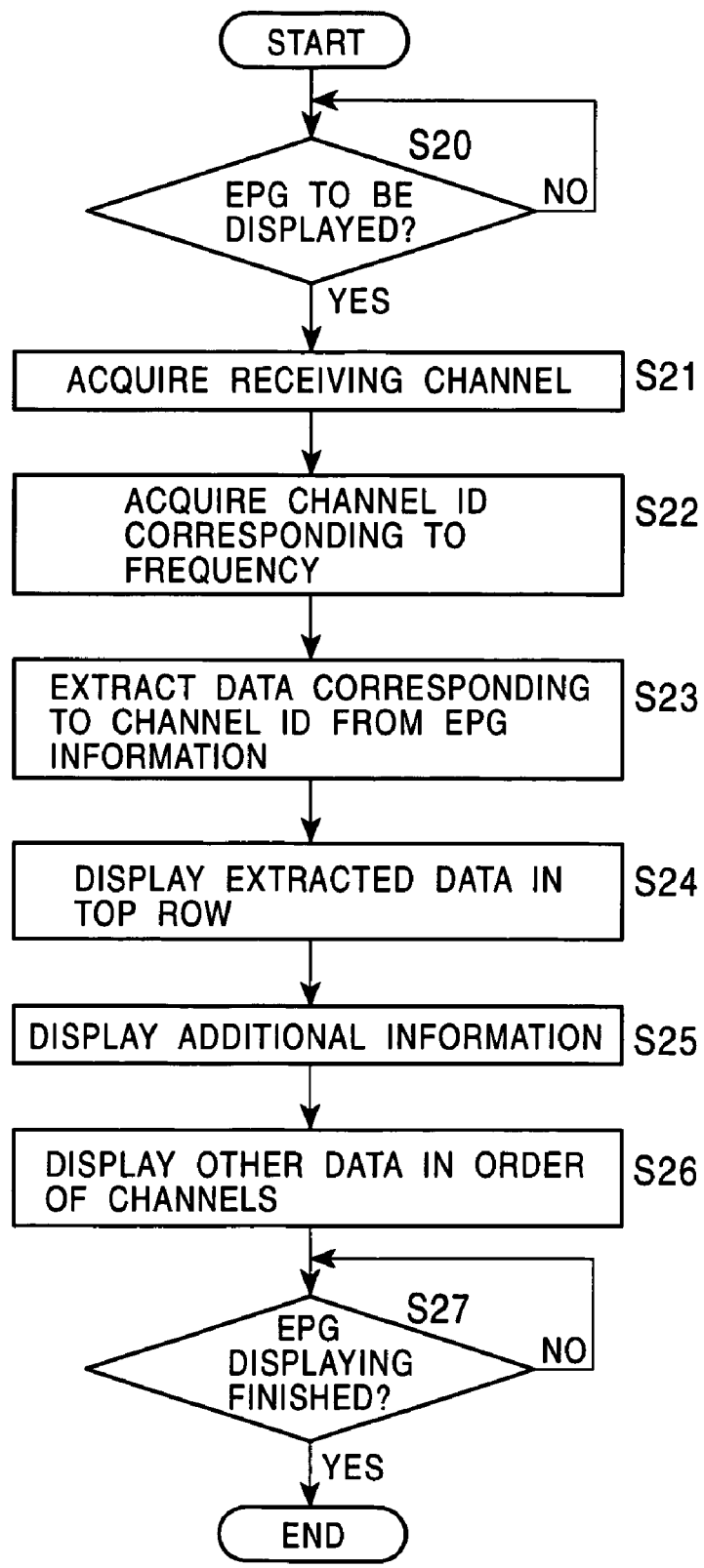
FIG. 10 is a flowchart illustrating a process executed in the receiving apparatus shown in FIG. 9.

FIG. 10 shows a flowchart illustrating a process executed in the controller 25 shown in FIG. 9.

When the process is executed, in step S20, a CPU 25*a* determines whether or not a predetermined input for displaying EPG has been provided from an input unit 26. If it is determined that the predetermined input has not been provided (NO), the process returns to step S20, in which the same processing is repeatedly performed until the predetermined input is provided. If it is determined that the predetermined input has been input (YES), the process proceeds to step S21.

In step S21, the CPU 25*a* acquires the frequency of a signal that is being received by a TV tuner 21. The process proceeds to step S22, in which the broadcasting station ID corresponding to the acquired frequency is retrieved from the ROM 25*b*.

FIG. 11 shows the table indicating the correspondence between frequencies and broadcasting station (channel) Ids. In the table, a frequency of 90 to 96 MHz corresponds to broadcaster "SOGO", a frequency of 102 to 108 MHz corresponds to broadcaster "KYOIKU", a frequency of 170 to 176 MHz corresponds to broadcaster "NIPPON", a frequency of 192 to 198 MHz corresponds to broadcaster "FUJI", and a frequency of 204 to 210 MHz corresponds to broadcaster "ASAHI".

In the case where the receiving frequency of the TV tuner 21 is, for example, 207 MHz, the CPU 25*a* acquires "ASAHI" as a broadcasting station (channel) ID.

In step S23, the CPU 25*a* extracts the program information corresponding to the broadcasting station ID acquired in step S22 from EPG data supplied from the TV tuner 21. The process proceeds to step S24.

In step S24, the CPU 25*a* enlarges the program information extracted in step S23, and writes it in a predetermined region of a frame memory 23, whereby it can be displayed in the top row on a CRT 24. The process proceeds to step S25.

In step S25, the CPU 25a causes the CRT 24 to display additional information (not shown) included in the EPG extracted by the TV tuner 21 in the second top row on the CRT 24. The additional information relates to a program title, program contents, or a cast.

The process proceeds to step S26, in which information on other programs (program information from broadcasting stations excluding the broadcasting station being received) is displayed on the CRT 24 in the order of channels.

FIG. 12 shows an example of an image displayed on the CRT 24 as a result of processing in steps S24 to S26. In this example the program information corresponding to broadcaster "ASAHI", which is program information corresponding to the broadcasting station being received, is displayed in the top row on the screen. In addition, under program names ("SUIYO SUSPENSE", "RYORI", and "SASURAI KEIJI KANJO-HEN"), program titles ("MIKKAINO SATSUJIN JIKEN" and "SHISANKA KIETA"), program contents ("KANINO MUSHI"), a cast (NAKAO KIYO, MORIMOTO REO, MATSUSHIMA SHIN-ICHI, YOSHIDA KAZUKO, NISHIDA MAKOTO), and so forth, are displayed. Under broadcaster "ASAHI", program information from other broadcasters (or channels): "SOGO", "KYOIKU", and "NIPPON" are sequentially displayed.

According to the above-described embodiment, program information from one broadcasting station being received is displayed in the top row, which enables the user to instantly refer to other programs from the broadcasting station.

Figure 13:
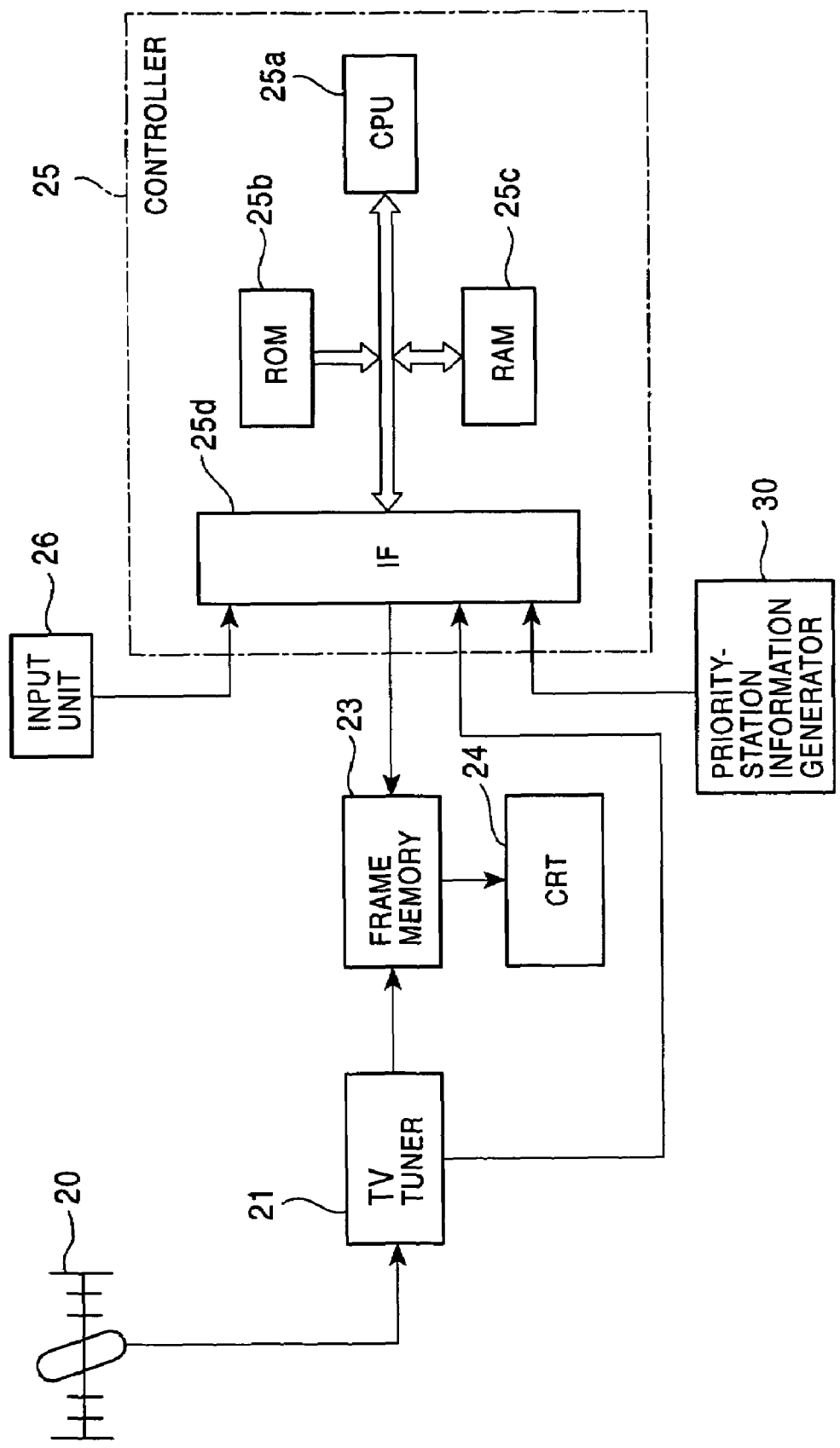
FIG. 13 is a block diagram showing a third embodiment of a receiving apparatus according to the present invention.

FIG. 13 shows a block diagram of a third embodiment of a receiving apparatus according to the present invention. Components in FIG. 3 corresponding to those shown in FIG. 4 are denoted by identical reference numerals for omitting descriptions.

Compared with the first embodiment shown in FIG. 4, in the third embodiment shown in FIG. 13, the provider-information extractor 22 is excluded and a priority-station information generator 30 is additionally provided. The structures of other components are identical to those shown in FIG. 4.

The priority-station information generator 30 is used to generate a tag (e.g., "ASAHI") indicating a broadcasting station in cooperation with a manufacturer that produces or sells the receiving apparatus.

Figure 14:
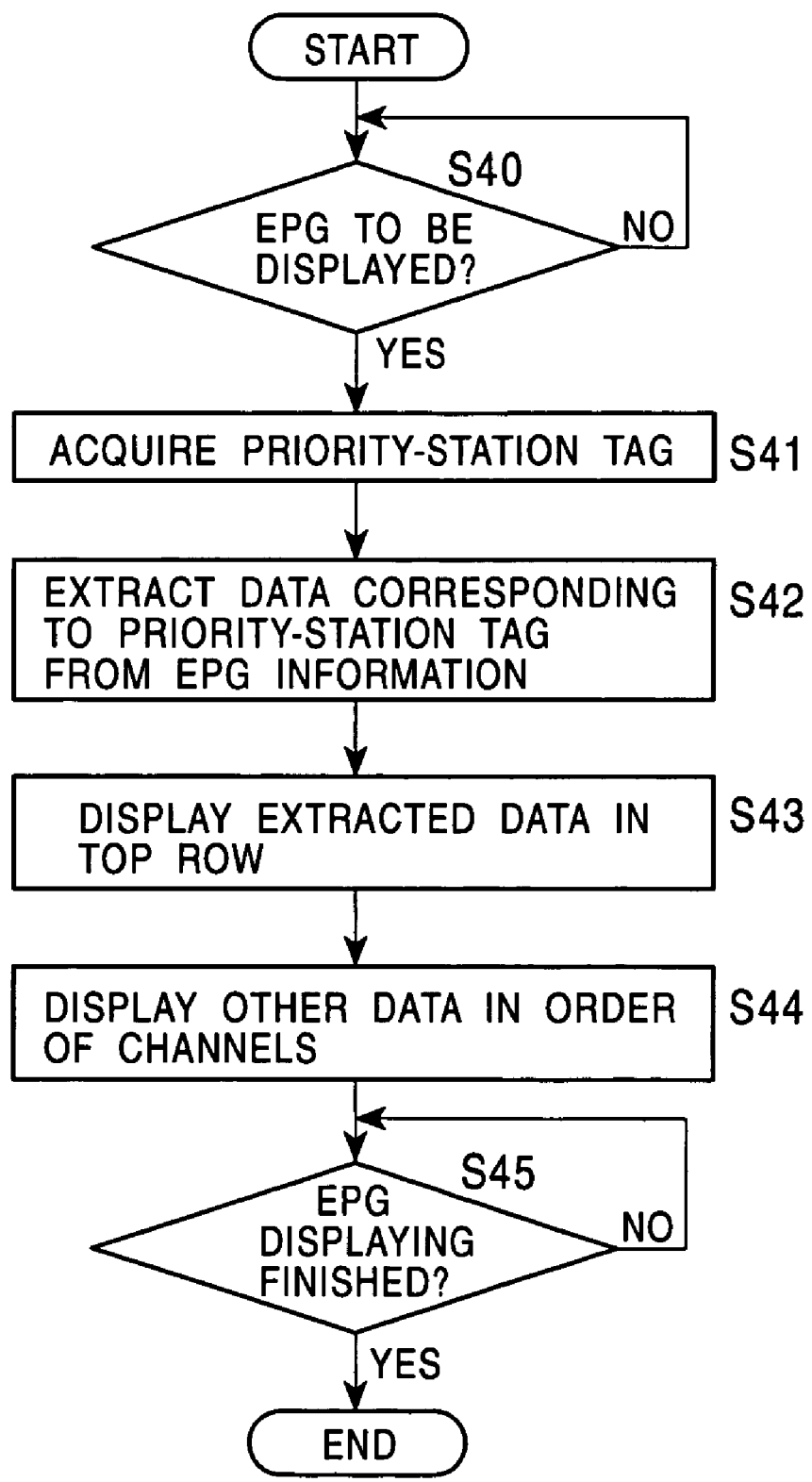
FIG. 14 is a flowchart illustrating a process executed in the receiving apparatus shown in FIG. 13.

The operation of the receiving apparatus according to the third embodiment will be described below, with reference to the flowchart shown in FIG. 14.

When the process is executed, in step S40, a CPU 25a in a controller 25 determines whether or not a predetermined input for displaying EPG has been provided from an input unit 26. If it is determined that the predetermined input has not been provided (NO), the process returns to step S40, in which the same processing is repeatedly performed. If it is determined that the predetermined input has been provided (YES), the process proceeds to step S41.

In step S41, the CPU 25a acquires the priority station tag output from the priority-station information generator 30. The process proceeds to step S42, in which the CPU 25a extracts program information corresponding to the priority station tag from EPG data output from the TV tuner 21.

In step S43, the CPU 25a enlarges the program information extracted in step S42 and writes it in a predetermined region of a frame memory 23, whereby it can be emphatically displayed in the top row on a CRT 24. In step S44, the CPU 25a uses the CRT 24 to display other program information in the order of channels.

Here, when it is assumed that broadcaster "ASAHI" is in cooperation with the manufacturer producing the receiving apparatus and that the priority-station information generator 30 generates "ASAHI" as a priority station tag, the image shown in FIG. 6 is displayed on the CRT 24 as a result of display processing in steps S43 and S44. Accordingly, a possibility in which programs from the broadcasting station in cooperation with the manufacturer producing the receiving apparatus are watched can be increased.

In the foregoing embodiments, an example of analog terrestrial broadcasting has been described. However, the present invention is not limited to such a case but, needless to say, it may be applied to, for example, satellite broadcasting, digital broadcasting, or cable television.

In this specification types of the transmission medium include not only information recording media such as a floppy disc and a CD-ROM but also network transmission media such as the Internet and a digital broadcasting satellite.

What is claimed is:

1. A receiving apparatus for receiving an image signal transmitted from a transmitting end that initiates the image signal, said receiving apparatus comprising:

receiving means for receiving said image signal;

first output means for outputting the image signal received by said receiving means to a display;

extracting means for extracting electronic program guide information (EPG) included in the image signal received by said receiving means, wherein the EPG information included in the image signal is from more than one broadcasting station;

alteration means for altering a display format of said EPG when said EPG is displayed on said display, in accordance with predetermined information originated from a first broadcasting station where a camera records the image signal and the EPG data is added such that the display format is altered according to the predetermined information to show a preference to provider tags of said first broadcasting station and a second broadcasting station over other provider tags of a plurality of broadcasting stations by displaying the provider tags of the first broadcasting station and the second broadcasting station on upper rows of the display; and second output means for outputting the EPG altered by said alteration means to said display, wherein said alteration means alters, according to the predetermined information, data constituting said EPG to be displayed in accordance with said predetermined information such that said EPG displays the provider tags of the first broadcasting station and the second broadcasting station with said preference.

2. A receiving apparatus according to claim 1, further comprising recording means for recording information representing a predetermined broadcasting station, wherein said predetermined information represents the predetermined broadcasting station recorded in said recording means.

3. A receiving apparatus according to claim 1, wherein said alteration means displays data constituting said EPG so that part of the data is emphasized in accordance with said predetermined information.

4. A receiving apparatus according to claim 1, wherein said alteration means displays data constituting said EPG so that additional information is added to part of the data in accordance with said predetermined information.

5. A receiving method for receiving an image signal transmitted from a transmitting end that initiates the image signal by a first broadcasting station among a plurality of broadcasting stations each having a provider tag, said receiving method comprising:

a receiving step for receiving said image signal;

a first output step for outputting the image signal received in said receiving step to a display;

an extracting step for extracting electronic program guide information (EPG) included in the image signal received in said receiving step, wherein the EPG information included in the image signal is from more than one broadcasting station;

an alteration step for altering a display format of said EPG when said EPG is displayed on said display, in accordance with predetermined information originated from the first broadcasting station where a camera records the image signal and the EPG data is added such that the display format is altered according to the predetermined information to show a preference to provider tags of said first broadcasting station and a second broadcasting station over other provider tags of said plurality of broadcasting stations by displaying the provider tag of the first broadcasting station and the second broadcasting station on upper rows of the display; and a second output step for outputting the EPG altered in said alteration step to said display, wherein said alteration step alters, according to the predetermined information, data constituting said EPG to be displayed in accordance with said predetermined information such that said EPG displays the provider tags of the first broadcasting station and the second broadcasting station with said preference.

6. A computer readable medium encoded with a computer program used in a receiving apparatus for receiving an image signal transmitted from a transmitting end that initiates the image signal by a first broadcasting station among a plurality of broadcasting stations each having a provider tag, said computer program configured to cause execution of the steps comprising:

a receiving step for receiving said image signal;

a first output step for outputting the image signal received in said receiving step to a display;

an extracting step for extracting electronic program guide information (EPG) included in the image signal received in said receiving step, wherein the EPG information included in the image signal is from more than one broadcasting station;

an alteration step for altering a display format of said EPG when said EPG is displayed on said display, in accordance with predetermined information originated from the first broadcasting station where a camera records the image signal and the EPG data is added such that the display format is altered according to the predetermined information to show a preference to the provider tag of said first broadcasting station and a second broadcasting station over other provider tags of said plurality of broadcasting stations by displaying the provider tag of the first broadcasting station and the second broadcasting station on upper rows of the display; and a second output step for outputting the EPG altered in said alteration step to said display, wherein said alteration step alters, according to the predetermined information, data constituting said EPG to be displayed in accordance with said predetermined information such that said EPG displays the provider tag of the first broadcasting station and the second broadcasting station with said preference.

7. A receiving apparatus for holding a computer readable medium encoded with a computer program and using said computer program to receive an image signal from a transmitting end that initiates the image signal by a first broadcasting station among a plurality of broadcasting stations each having a provider tag, said computer program configuring the receiving apparatus such that the receiving apparatus is configured:

to receive said image signal;

to first output the image signal received in said receiving step to a display;

to extract electronic program guide information (EPG) included in the image signal received, wherein the EPG information included in the image signal is from more than one broadcasting station;

to alter a display format of said EPG when said EPG is displayed on said display, in accordance with predetermined information originated from the first broadcasting station where a camera records the image signal and the EPG data is added such that the display format is altered according to the predetermined information to show a preference to the provider tags of said first broadcasting station and a second broadcasting station over other provider tags of said plurality of broadcasting stations by displaying the provider tag of the first broadcasting station and the second broadcasting station on upper rows of the display; and to second output the EPG altered in said alteration step to said display, wherein, according to the predetermined information, data constituting said EPG to be displayed in accordance with said predetermined information such that said EPG displays the provider tags of the first broadcasting station and the second broadcasting station with said preference.

8. A transmitting apparatus for initiating and transmitting an image signal from a transmitting end to a receiving end, said transmitting apparatus comprising:

first generating means for generating said image signal;

second generating means for generating electronic program guide information (EPG);

third generating means for generating at a first broadcasting station where a camera records the image signal predetermined information providing said EPG, said first broadcasting station being one of a plurality of broadcasting stations each having a provider tag;

adding means for adding at the first broadcasting station said EPG generated by said second generating means and said predetermined information originated from the first broadcasting station such that according to the predetermined information a preference to the provider tags of said first broadcasting station and a second broadcasting station is provided over other provider tags of said plurality of broadcasting stations by displaying the provider tags of the first broadcasting station and the second broadcasting station on upper rows of the display, which is generated by said third generating means, to said image signal generated by said first generating means; and transmitting means for transmitting to the receiving end the signal obtained by adding said EPG and said predetermined information to said image signal, wherein the EPG being added includes EPG information from more than one of said plurality of broadcasting station, wherein said adding means alters, according to the predetermined information, data constituting said EPG to be displayed in accordance with said predetermined information such that said EPG displays the provider tags of the first broadcasting station and the second broadcasting station with said preference.

9. A transmitting method for initiating and transmitting an image signal from a transmitting end to a receiving end, said transmitting method comprising:
- a first generating step for generating said image signal;
- a second generating step for generating electronic program guide information (EPG);
- a third generating step for generating at a first broadcasting station where a camera records the image signal predetermined information providing said EPG, said first broadcasting station being one of a plurality of broadcasting stations each having a provider tag;
- an adding step for adding at the first broadcasting station said EPG generated in said second generating step and said predetermined information originated from the first broadcasting station where a camera records the image signal such that according to the predetermined information a preference to the provider tags of said first broadcasting station and a second broadcasting station is provided over other provider tags of said plurality of broadcasting stations by displaying the provider tags of the first broadcasting station and the second broadcasting station on upper rows of the display, which is generated in said third generating step, to said image signal generated in said first generating step; and
- a transmitting step for transmitting to the receiving end the signal obtained in said adding step by adding said EPG and said predetermined information to said image signal, wherein the EPG being added includes EPG information from more than one of said plurality of broadcasting station,
- wherein said adding step alters, according to the predetermined information, data constituting said EPG to be displayed in accordance with said predetermined information such that said EPG displays the provider tags of the first broadcasting station and the second broadcasting station with said preference.

10. A computer-readable medium encoded with a computer program used in a transmitting apparatus for initiating and transmitting an image signal from a transmitting end to a receiving end, said computer program configured to cause execution of the steps comprising:
- a first generating step for generating said image signal;
- a second generating step for generating electronic program guide information (EPG);
- a third generating step for generating at a first broadcasting station where a camera records the image signal predetermined information providing said EPG, said first broadcasting station being one of a plurality of broadcasting stations each having a provider tag;
- an adding step for adding at the first broadcasting station said EPG generated in said second generating step and said predetermined information originated from the first broadcasting station such that according to the predetermined information a preference to the provider tags of said first broadcasting station and a second broadcasting station is provided over other provider tags of said plurality of broadcasting stations by displaying provider tags of the first broadcasting station and the second broadcasting station on upper rows of the display, to said image signal generated in said first generating step; and
- a transmitting step for transmitting to the receiving end the signal obtained in said adding step by adding said EPG and said predetermined information to said image signal, wherein the EPG being added includes EPG information from more than one of said plurality of broadcasting station,
- wherein said adding step alters, according to the predetermined information, data constituting said EPG to be displayed in accordance with said predetermined information such that said EPG displays the provider tags of the first broadcasting station and the second broadcasting station with said preference.

11. A transmitting apparatus for holding a computer readable medium encoded with a computer program and using said computer program to transmit an image signal from a transmitting end that initiates the image signal, said computer program configuring the transmitting apparatus such that the transmitting apparatus is configured:
- to first generate said image signal;
- to second generate electronic program guide information (EPG);
- to third generate at a first broadcasting station where a camera records the image signal predetermined information providing said EPG, said first broadcasting station being one of a plurality of broadcasting stations each having a provider tag;
- to add at the first broadcasting station said EPG generated and said predetermined information originated from the first broadcasting station such that a preference to the provider tags of said first broadcasting station and a second broadcasting station is provided over other provider tags of said plurality of broadcasting station by displaying the provider tags of the first broadcasting station and the second broadcasting station on upper rows of the display to said image signal generated; and
- to transmit to a receiving end the signal obtained in said adding step by adding said EPG and said predetermined information to said image signal, wherein the EPG being added includes EPG information from more than one of said plurality of broadcasting station,
- wherein, according to the predetermined information, data constituting said EPG to be displayed in accordance with said predetermined information such that said EPG displays the provider tags of the first broadcasting station and the second broadcasting station with said preference.

12. A receiving apparatus for receiving an image signal initiated and transmitted from a transmitting end by a first broadcasting station among a plurality of broadcasting stations each having a provider tag, said receiving apparatus comprising:
- a receiver configured to receive said image signal;
- a first output device configured to output the image signal received by said receiver to a display;
- an extractor configured to extract electronic program guide information (EPG) included in the image signal received by said receiver, wherein the EPG information included in the image signal is from more than one broadcasting station;
- an alteration device configured to alter a display format of said EPG when said EPG is displayed on said display, in accordance with predetermined information originated from the first broadcasting station where a camera records the image signal and the EPG data is added such that the display format is altered according to the predetermined information to show a preference to the provider tags of said first broadcasting station and a second broadcasting station over other provider tags of said plurality of broadcasting stations by displaying the provider tags of the first broadcasting station and the second broadcasting station on upper rows of the display; and an second output device configured to output altered EPG to said display, wherein said alteration device is configured to alter, according to the predetermined information, data constituting said EPG to be displayed in accordance with said predetermined information such that said EPG displays the provider tags of the first broadcasting station and the second broadcasting station with said preference.

13. A receiving method for receiving an image signal initiated and transmitted from a transmitting end by a first broadcasting station among a plurality of broadcasting stations each having a provider tag, said receiving method comprising:

receiving said image signal;

outputting the image signal received in said receiving step to a display;

extracting electronic program guide information (EPG) included in the image signal received in said receiving step, wherein the EPG information included in the image signal is from more than one broadcasting station;

altering a display format of said EPG when said EPG is displayed on said display, in accordance with predetermined information originated from the first broadcasting station where a camera records the image signal and the EPG data is added such that the display format is altered according to the predetermined information to show a preference to the provider tags of said first broadcasting station and a second broadcasting station over other provider tags of said plurality of broadcasting stations by displaying the provider tags of the first broadcasting station and the second broadcasting station on upper rows of the display; and outputting altered EPG information to said display, wherein said altering alters, according to the predetermined information, data constituting said EPG to be displayed in accordance with said predetermined information such that said EPG displays the provider tags of the first broadcasting station and the second broadcasting station with said preference.

14. A computer-readable medium encoded with a computer program used in a receiving apparatus for receiving an image signal initiated and transmitted from a transmitting end by a first broadcasting station among a plurality of broadcasting stations each having a provider tag, said computer program configured to cause execution of the steps of:

receiving said image signal;

outputting the image signal received in said receiving step to a display;

extracting electronic program guide information (EPG) included in the image signal received in said receiving step, wherein the EPG information included in the image signal is from more than one broadcasting station;

altering a display format of said EPG when said EPG is displayed on said display, in accordance with predetermined information originated from the first broadcasting station where a camera records the image signal and the EPG data is added such that the display format is altered according to the predetermined information to show a preference to the provider tags of said first broadcasting station and a second broadcasting station over other provider tags of said plurality of broadcasting stations by displaying the provider tags of the first broadcasting station and the second broadcasting station on upper rows of the display; and outputting altered EPG information to said display, wherein said altering alters, according to the predetermined information, data constituting said EPG to be displayed in accordance with said predetermined information such that said EPG displays the provider tags of the first broadcasting station and the second broadcasting station with said preference.

15. A receiving apparatus holding a computer readable medium encoded with a computer program and using said computer program to receive an image signal from a transmitting end that initiates the image signal by a first broadcasting station among a plurality of broadcasting stations each having a provider tag, said computer program configuring the receiving apparatus such that the receiving apparatus is configured:

to receive said image signal;

to output the image signal received to a display;

to extract electronic program guide information (EPG) included in the image signal received, wherein the EPG information included in the image signal is from more than one broadcasting station;

to alter a display format of said EPG when said EPG is displayed on said display, in accordance with predetermined information originated from the first broadcasting station where a camera records the image signal and the EPG data is added such that the display format is altered according to the predetermined information to show a preference to the provider tags of said first broadcasting station and a second broadcasting station over other provider tags of said plurality of broadcasting stations by displaying the provider tags of the first broadcasting station and the second broadcasting station on upper rows of the display; and to output altered EPG information to said display, wherein, according to the predetermined information, data constituting said EPG to be displayed in accordance with said predetermined information such that said EPG displays the provider tags of the first broadcasting station and the second broadcasting station with said preference.

16. A transmitting apparatus for initiating and transmitting an image signal from a transmitting end to a receiving end, comprising:

a first generator configured to generate said image signal;

a second generator configured to generate electronic program guide information (EPG);

a third generator configured to generate at a first broadcasting station where a camera records the image signal predetermined information providing said EPG, said first broadcasting station being one of a plurality of broadcasting stations each having a provider tag;

an adder configured to add said EPG generated by said second generator and said predetermined information originated from the first broadcasting station such that according to the predetermined information a preference to the provider tags of said first broadcasting station and a second broadcasting station is provided over other provider tags of said plurality of broadcasting stations to said image signal generated by said first generator by displaying the provider tags of the first broadcasting station and the second broadcasting station on upper rows of the display; and a transmitting device configured to transmit to the receiving end a signal obtained by adding said EPG and said predetermined information to said image signal, wherein the EPG being added includes EPG information from more than one of said plurality of broadcasting station, wherein said adder is configured to alter, according to the predetermined information, data constituting said EPG to be displayed in accordance with said predetermined information such that said EPG displays the provider tags of the first broadcasting station and the second broadcasting station with said preference.

17. A transmitting method for initiating and transmitting an image signal from a transmitting end to a receiving end, comprising:

generating said image signal;

generating electronic program guide information (EPG);

generating at a first broadcasting station where a camera records the image signal predetermined information providing said EPG, said first broadcasting station being one of a plurality of broadcasting stations each having a provider tag;

adding said EPG generated in said generating electronic program guide information step and said predetermined information originated from the first broadcasting station such that according to the predetermined information a preference to the provider tags of said first broadcasting station and a second broadcasting station is provided over other provider tags of said plurality of broadcasting stations to said image signal generated by displaying the provider tags of the first broadcasting station and the second broadcasting station on upper rows of the display in said generating said image signal step; and transmitting to the receiving end a signal obtained in said adding step by adding said EPG and said predetermined information to said image signal, wherein the EPG being added includes EPG information from more than one of said plurality of broadcasting station, wherein said adding step alters, according to the predetermined information, data constituting said EPG to be displayed in accordance with said predetermined information such that said EPG displays the provider tag of the first broadcasting station and the second broadcasting station with said preference.

18. A computer-readable medium encoded with a computer program used in a transmitting apparatus for transmitting an image signal from a transmitting end that initiates the image signal to a receiving end, said computer program configured to cause execution of the steps of:

generating said image signal;

generating electronic program guide information (EPG);

generating at a first broadcasting station where a camera records the image signal predetermined information providing said EPG, said first broadcasting station being one of a plurality of broadcasting stations each having a provider tag;

adding at the first broadcasting station said EPG generated in said generating electronic program guide information step and said predetermined information originated from the first broadcasting station such that according to the predetermined information a preference to the provider tags of said first broadcasting station and a second broadcasting station is provided over other provider tags of said plurality of broadcasting stations to said image signal generated in said generating said image signal step by displaying the provider tags of the first broadcasting station and the second broadcasting station on upper rows of the display; and transmitting to the receiving end a signal obtained in said adding step by adding said EPG and said predetermined information to said image signal, wherein the EPG being added includes EPG information from more than one of said plurality of broadcasting station, wherein said adding alters, according to the predetermined information, data constituting said EPG to be displayed in accordance with said predetermined information such that said EPG displays the provider tags of the first broadcasting station and the second broadcasting station with said preference.

19. A transmitting apparatus for holding a computer readable medium encoded with a computer program and using said computer program to transmit an image signal from a transmitting end that initiates the image signal, said computer program configuring the transmitting apparatus such that the transmitting apparatus is configured:

to generate said image signal;

to generate electronic program guide information (EPG);

generating to generate at a first broadcasting station where a camera records the image signal predetermined information providing said EPG, said first broadcasting station being one of a plurality of broadcasting stations each having a provider tag;

to add at the first broadcasting station said EPG generated in said generating electronic program guide information step and said predetermined information originated from the first broadcasting station such that according to the predetermined information a preference to the provider tags of said first broadcasting station and a second broadcasting station is provided over other provider tags of said plurality of broadcasting stations by displaying the provider tags of the first broadcasting station and the second broadcasting station on upper rows of the display to said image signal generated in said generating said image signal step; and to transmit to a receiving end a signal obtained in said adding step by adding said EPG and said predetermined information to said image signal, wherein the EPG being added includes EPG information from more than one of said plurality of broadcasting station, wherein, according to the predetermined information, data constituting said EPG to be displayed in accordance with said predetermined information such that said EPG displays the provider tags of the first broadcasting station and the second broadcasting station with said preference.

* * * * *